Patented Jan. 22, 1946

2,393,561

UNITED STATES PATENT OFFICE 2,393,561

VEGETABLE CONCENTRATES AND METHOD OF PREPARING SAME

Ramon Perech, New York, N. Y.

No Drawing. Application January 8, 1944,
Serial No. 517,546

9 Claims. (Cl. 99—206)

The present invention has for an object to provide improved fruit concentrates and to provide an improved method of producing such concentrates.

The invention has been developed in the making of dry powdered concentrates of fruit juices and other vegetable juices, including both those juices which are prepared by separation of the pulp of the fruit as completely as possible and those which are prepared to include part or all of the pulp as a desirable part of the juice. For convenience of disclosure to illustrate the principles of the invention such an embodiment of the invention will herein be more particularly described.

Many attempts have been made by research laboratories to develop methods for the preparation of concentrates of fruit juices, with varying degrees of success. The demand for such concentrates has increased with war conditions and the shortage of transportation facilities, and especially with the requirements of feeding huge armies abroad. The importance of the problem is obvious when it is realized that 85 to 95% of the total content of most juices is water.

The present invention aims to provide a method for preparing concentrates of various vegetable juices including the more commonly used fruit juices such that when the concentrate is added to water a palatable drink possessing the aroma, flavor, vitamin content and other qualities of the original juice will be immediately produced.

The invention aims also to provide an improved method for dehydrating juices, such, for example, as tomato juice, pineapple juice, apple juice, cranberry juice, the juices of lemons, oranges, grapefruit, and even juices prepared from bananas and from some of the other more solid vegetables, to produce a solid product, preferably in the form of a powder, which will be stable, easily packaged and immediately effective to produce a satisfactory soup, beverage, or paste.

Partial dehydration of juices is relatively simple, but as the final stages of the process are approached, difficulties occur. In order to facilitate the performance of dehydration and at the same time improve the end results, pectin, starch, gums and other substances have been added, but the resulting products leave much to be desired.

It has been discovered in accordance with the present invention that the addition of a water-soluble cellulose compound of suitable character to the vegetable juices, before dehydration has been carried too far, will cause a better concentrate to be formed. With this addition the concentrates, when mixed with water, provide a beverage possessing the flavor, aroma, vitamin content and other desirable qualities of the juices from which the concentrates were produced.

Without attempting to explain the reason for the results obtained it can be stated that due experiment and testing clearly establish the superiority of the product. It may be noted that cellulose is a natural constituent of various fruits and other vegetable products, even of fruits high in juice content such as oranges, pineapples and tomatoes. In the preparation of the juices as a beverage by some processes the juice becomes separated from a major proportion of the original cellulose content. For example, according to Konig, 0.8% of the whole tomato is cellulose, whereas only about 0.2% of cellulose is present in the prepared tomato juice. It is believed that for juices made from vegetable products of this type, the cellulose content added should be comparable in quantity to that of the original cellulose content of the given fruit or other vegetable product. In any event, satisfactory results have been obtained by the addition of about 0.3% to 1% of the weight of the juice of the above-mentioned cellulose compound and it may be increased to 3% or more, experiment has demonstrated. Addition of .3% to a juice containing about 15% of solids will produce about 2% of the carboxymethyl cellulose compound in the evaporated dried product. For best results, it is believed, by reason of tests, that the added cellulose content should amount to between 0.5 and 1%. The percentage may be varied, however, as experience may dictate.

Juices prepared by methods which retain a high proportion of the vegetable cellulose can also be dehydrated effectively by the process of the present invention. Preferably, when part or all of the pulp is retained, the whole juice, either before or after partial dehydrating is treated in a colloidal mill, such as the Premier colloidal mill, in order to reduce the pulp to fine colloidal condition. In juices of this type the addition of 0.3 to 0.8% of cellulose improves the ultimately produced concentrate even though the cellulose content is already relatively high.

According to the present invention, salts of carboxymethyl cellulose (also sometimes erroneously referred to as cellulose glycolate), such as sodium, potassium, ammonium, etc. have been found to be decidedly superior to other cellulose compounds for use as an addition agent. Of these compounds the sodium salt is preferred. It is water soluble and stable in hot and cold water within the range of temperatures found effective for dehydration of extracts and infusions. In this country the Hercules Powder Company at my request produced samples of sodium-carboxy-methyl-cellulose and this material has been used successfully by me in producing a number of concentrates in accordance with this invention. This compound has been marketed abroad as "Cellofas WFZ" and also as "Sodium-cellulose-glycolate." The cellulose compound should be added well before the final dehydration treatment is completed, while the product is still to a substantial degree liquid.

Carboxy methyl cellulose and its salts are inert physiologically and are no more objectionable in the vegetable juice drink or soup produced or other food products than is the natural cellulose content of untreated juices. When mixed with the reconstituted juice beverage it becomes an inseparable homogenized component of the beverage.

The following examples illustrate the practice of the invention:

*Example 1.*—Take tomato juice from the raw fruit or use canned tomato juice such as sold under the trade name, "Campbell's." Add sodium carboxymethyl cellulose equal to ⅓ of 1% of the weight of the juice. Dehydrate by evaporation under 28 in. of vacuum until about 80% of the natural water of the juice has been removed. This partially dehydrated but still fluid mass is then finally dried on a drum dryer under a vacuum of about 28 in. of mercury and at a steam pressure of 12 lbs. The resulting product hardens upon cooling and is then pulverized by a mill, converting it into a powder. The sodium carboxy methyl cellulose may be introduced at any point in the dehydration procedure up to the time at which the juice has to undergo the final drying process.

*Example 2.*—Raw orange juice having a solid content of about 15% is evaporated under a 28 in. vacuum until ⅔ of the water is removed. Sodium carboxymethyl cellulose of a weight equal to ¾% of the weight of the original juice is added to the plain or partially dehydrated juice. The mixture is then completely dehydrated on a drum dryer under a 27 in. vacuum at a steam pressure of 12 lbs. The final dehydrated product is then ground to provide a water-soluble powder.

Pineapple juice, lemon juice, grapefruit juice, cranberry juice and the like may be similarly treated to provide solid concentrates.

Fruit juices from which concentrates are to be prepared according to the present invention can be prepared by reducing the whole fruit or other vegetable food to an emulsion or liquid in a colloidal mill, instead of separating the juice from the pulp.

*Example 3.*—Ripe bananas of any of the several suitable varieties are treated in a premier colloidal mill to form a homogeneous and practically non-precipitating liquid. This product, after addition of sodium carboxy-methyl cellulose equal to about 0.3% of the weight of the original emulsion, is evaporated under high vacuum to reduce its fluidity. The mixture is then dried on a drum dryer to produce a dry powder.

*Example 4.*—Ripe pineapple pulp is crushed and shredded and then ground in a colloidal mill to reduce the pulp to colloidal condition. Potassium carboxymethyl cellulose of a weight equal to 0.4% of the weight of the complete juice is added and the mixture dehydrated as in other examples.

*Example 5.*—Ripe cranberries pulp is crushed and shredded and then ground in a colloidal mill to reduce the pulp to colloidal condition. Ammonium carboxymethyl cellulose of a weight equal to 0.4% of the weight of the complete juice is added and the mixture dehydrated as in other examples.

Apples, peaches, plums and many other foods can be treated to separate the liquid juice from the pulp or they may be treated in the colloidal mill to provide a juice having the pulp as a fine colloidal content therein. Either type of juice can be treated to form a dry powder according to the process of the present invention. When the pulp is ground to a sufficiently fine colloidal condition the juice before dehydration is substantially stable and non-precipitating. The beverage formed by adding water to the concentrate produced from such juice is of the same character.

Spray drying or shelf drying or other drying processes may be substituted for the drum drying. Vacuum drum drying may be substituted by atmospheric drum drying, if desired. No matter what the method by which the final drying is accomplished the concentrates produced from juices are substantially water soluble and those produced from juices of other types containing considerable pulp are always capable by effectively mixing with water to form sufficiently stable, palatable beverages possessing the flavor, aroma, and substantially the vitamin content of the juices from which they were made. When the final drying is performed in a drum dryer the resulting product is in the form of flakes, whereas by spray drying a fine powder results, eliminating thereby the further step of grinding to powder. The flake or powder form results from carrying the evaporating process to its ultimate stage. If partially liquid or pulp or paste form is preferred the process is halted at an earlier stage.

The foregoing particular description of selected embodiments of the invention is illustrative merely and is not intended to be construed as defining the limits of the invention. Numerous variations may be adopted without departing from the spirit of the invention.

The expression "carboxymethyl cellulose and its salts" as employed in the appended claims is intended to designate carboxymethyl cellulose and its edible salts soluble in the reconstituted fruit concentrate employed, including the sodium, potassium and ammonium salts of said carboxymethyl cellulose. The expression "concentrate" is intended to designate a dry or semi-dry product or, where the context permits, partially evaporated fluid, including evaporated juices and pulps. The expression "fruit" is intended to designate orange, lemon, pineapple or other fruits as well as tomato or other vegetables.

This application is a continuation, in part, of my co-pending applications, Ser. 493,837, filed July 8, 1943, and Ser. No. 509,591, filed November 9, 1943, and Ser. No. 515,795, filed December 27, 1943.

I claim:

1. A readily dispersible fruit concentrate containing in substantial amount a water-soluble carboxymethyl cellulose compound.

2. A readily dispersible dried fruit solid containing as its principal ingredients, evaporated fruit juice and a water-soluble carboxymethyl cellulose compound.

3. A readily dispersible non-deliquescent powdered fruit concentrate containing as its principal ingredients, evaporated fruit solids and water-soluble sodium carboxymethyl cellulose.

4. A readily dispersible non-deliquescent powdered fruit concentrate containing as its principal ingredients, evaporated fruit solids and at least about 2% sodium carboxymethyl cellulose.

5. A tomato juice concentrate capable of forming, when combined with water, a palatable drink having the flavor of the original tomato juice comprising as its principal ingredients evaporated tomato juice and water-soluble sodium carboxymethyl cellulose.

6. The method of preparing a fruit concentrate which comprises dehydrating fruit in a fluid state to remove a large proportion of the water, adding to the dehydrated material a water-soluble salt of carboxymethyl cellulose, and further dehydrating the mixture to substantial dryness.

7. The method of preparing a fruit concentrate which comprises both evaporating water from a fruit juice and adding to the juice a substance selected from the group consisting of sodium carboxymethyl cellulose, potassium carboxymethyl cellulose, and ammonium carboxymethyl cellulose.

8. The method of preparing a fruit concentrate which comprises both evaporating water from a fruit juice and adding to the juice about .3 to about 1% of sodium carboxymethyl cellulose.

9. A dried citrus fruit juice containing at least about 2% of sodium carboxymethyl cellulose.

RAMON PERECH.